United States Patent
Koga

(10) Patent No.: US 11,456,640 B2
(45) Date of Patent: Sep. 27, 2022

(54) ROTOR FOR ROTARY ELECTRIC MACHINE

(71) Applicant: Mitsubishi Electric Corporation, Tokyo (JP)

(72) Inventor: Kiyonori Koga, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 107 days.

(21) Appl. No.: 17/258,283

(22) PCT Filed: Jul. 26, 2018

(86) PCT No.: PCT/JP2018/028060
§ 371 (c)(1),
(2) Date: Jan. 6, 2021

(87) PCT Pub. No.: WO2020/021673
PCT Pub. Date: Jan. 30, 2020

(65) Prior Publication Data
US 2021/0281135 A1    Sep. 9, 2021

(51) Int. Cl.
*H02K 1/32* (2006.01)
*H02K 3/50* (2006.01)
(Continued)

(52) U.S. Cl.
CPC .............. *H02K 1/32* (2013.01); *H02K 1/26* (2013.01); *H02K 3/24* (2013.01); *H02K 9/08* (2013.01)

(58) Field of Classification Search
CPC .. H02K 1/32; H02K 3/24; H02K 9/08; H02K 1/26; H02K 1/265; H02K 3/50; H02K 3/51
(Continued)

(56) References Cited

U.S. PATENT DOCUMENTS

| 2003/0029624 A1* | 2/2003 | Klaar ................. H02K 3/22 174/15.6 |
| 2007/0096590 A1* | 5/2007 | Salamah ............. H02K 3/24 310/61 |

(Continued)

FOREIGN PATENT DOCUMENTS

| JP | S60200737 A | 10/1985 |
| JP | 2009011059 A | 1/2009 |
| JP | 4897587 B2 | 3/2012 |

OTHER PUBLICATIONS

International Search Report (PCT/ISA/210) dated Oct. 23, 2018, by the Japan Patent Office as the International Searching Authority for International Application No. PCT/JP2018/028060.

(Continued)

*Primary Examiner* — Michael Andrews
(74) *Attorney, Agent, or Firm* — Buchanan Ingersoll & Rooney PC

(57) ABSTRACT

A rotor includes: a tubular retaining ring opened on an outer side thereof in an axial direction and covering a coil end portion of each of coils; and rotor baffles and insulation baffles alternately connected in a circumferential direction and partitioning a space in the retaining ring into a first space and a second space, the first space is formed over an entire circumference around a shaft, each rotor baffle includes, at a part thereof on a radially outer side of which a jumper portion is present, a first tapered shape part tilted so as to be more apart from the jumper portion toward a center side in the axial direction of the rotor.

20 Claims, 19 Drawing Sheets

(51) Int. Cl.
*H02K 1/26* (2006.01)
*H02K 3/24* (2006.01)
*H02K 9/08* (2006.01)

(58) Field of Classification Search
USPC .................................... 310/58, 59, 61, 65
See application file for complete search history.

(56) References Cited

U.S. PATENT DOCUMENTS

| 2007/0222333 | A1* | 9/2007 | Hattori | ..................... | H02K 3/51 |
| | | | | | 310/58 |
| 2017/0033633 | A1* | 2/2017 | Nagayasu | ................ | H02K 3/24 |

OTHER PUBLICATIONS

Written Opinion (PCT/ISA/237) dated Oct. 23, 2018, by the Japan Patent Office as the International Searching Authority for International Application No. PCT/JP2018/028060.

* cited by examiner

ROTOR FOR ROTARY ELECTRIC MACHINE

TECHNICAL FIELD

The present disclosure relates to a rotor for a rotary electric machine.

BACKGROUND ART

Conventionally, a technology in which a space having coil end portions formed therein is partitioned in a circumferential direction in order to form air passages for coil end cooling gas for a rotor, has been proposed as a rotor for a rotary electric machine (see, for example, Patent Document 1).

CITATION LIST

Patent Document

Patent Document 1: Japanese Laid-Open Patent Publication No. 2009-11059

SUMMARY OF THE INVENTION

Problems to be Solved by the Invention

The rotor for a rotary electric machine described in Patent Document 1 includes a tubular retaining ring on the outer circumferential side of the coil end portions. Coils extending in an axial direction from slots in a rotor core are bent by 90° in the circumferential direction, led in the circumferential direction along the inner circumferential surface of the retaining ring, and further bent by 90° in the axial direction to be accommodated in slots in the rotor core again. The rotor includes four sets of such coils. A space on the inner side in the radial direction of the coil end portions of the rotor is partitioned into four spaces in the circumferential direction by four rotor baffles arranged in the circumferential direction. The spaces are defined as first spaces. Insulation baffles are present on the outer side in the radial direction of the first spaces, and gaps are formed between the insulation baffles and the rotor core. The coil end portions that stand in the axial direction are present on the outer side of the gaps.

Spaces on the outer side in the radial direction of the insulation baffles are in communication with each other in the circumferential direction and integrated with spaces (gathering parts) on the outer side in the radial direction of the rotor baffles. In this portion, jumper portions of the coil end portions are accommodated. The series of spaces that are present on the outer side in the radial direction relative to the above-described gaps are defined as second spaces.

In the configuration in Patent Document 1, the four first spaces are independent of each other in the circumferential direction. The first spaces are the only portions that allow the intake of cooling gas for cooling the coil end portions of the rotor. Thus, guide boards are disposed at an inlet to the first spaces in order to increase the efficiency of the intake of cooling gas. However, as described above, the inlet for cooling gas is divided into four portions in the circumferential direction, and ends in the axial direction between the portions are closed. Therefore, a problem arises in that the cross-sectional area of the inlet of an air passage for cooling gas taken into the rotor is made small, whereby the air flow resistance increases.

In addition, another problem arises in that, at a portion on the lag side in a rotation direction, the flow of cooling gas is separated so that the air flow resistance at the inlet of an gas passage in rotor provided inside the rotor increases, whereby cooling gas becomes less likely to enter the gas passage in rotor.

Further, still another problem arises in that the amount of cooling gas passing between conductors of the coil ends of the rotor and flowing from the first spaces to the gathering parts of the second spaces so as to cool the coil ends also becomes insufficient, whereby, when the output of the rotary electric machine is increased, the cooling performance becomes insufficient and a coil temperature increases.

The present disclosure has been made to solve the above problems, and an object of the present disclosure is to provide a rotor for a rotary electric machine capable of sufficiently supplying cooling gas to a coil end portion of the rotor and the inside of the rotor.

Solution to the Problems

A rotor for a rotary electric machine according to the present disclosure is a rotor for a rotary electric machine, the rotor including a shaft, a rotor core, and coils incorporated in slots of the rotor core, the rotor including:

a tubular retaining ring opened on an outer side thereof in an axial direction and covering a coil end portion of each coil; and rotor baffles and insulation baffles alternately connected in a circumferential direction and partitioning a space in the retaining ring into a first space on an inner side in a radial direction where the coil end portion is not present, and a second space on an outer side in the radial direction where a center portion in the circumferential direction of the coil end portion is present, wherein each rotor baffle is disposed on an inner side in the radial direction of a portion, of the corresponding coil end portion, at which a jumper portion is formed, the insulation baffles are disposed along end surfaces on an inner side in the radial direction of extending portions of a plurality of conductors forming the coil end portions, a gap is present between an end surface of the rotor core and an end, on a center side of the rotor, of each insulation baffle, the first space is formed over an entire circumference around the shaft, and the rotor baffle includes, at a part thereof on a radially outer side of which the jumper portion is present, a first tapered shape part tilted so as to be more apart from the jumper portion toward a center side in the axial direction of the rotor.

Effect of the Invention

In the rotor for a rotary electric machine according to the present disclosure, regarding a radially outer part of the second space relative to the first tapered shape part, a space at the radially outer part is expanded more in the radial direction toward the center side in the axial direction. Accordingly, cooling gas having gathered at a gathering part through a plurality of gas spaces S between conductors W1 to W6 can be efficiently discharged to a first gas passage F1.

DESCRIPTION OF EMBODIMENTS

Embodiment 1

Hereinafter, a rotor for a rotary electric machine according to embodiment 1 will be described with reference to the drawings.

In the present specification, an axial direction, a radial direction, and a circumferential direction refer to the axial direction, the radial direction, and the circumferential direction of the rotor, unless otherwise specified. A center side refers to the center side of the rotor relative to members and portions being mentioned. When a number is mentioned, the number refers to a number on one end side of a rotor core, unless otherwise specified.

Figure 1:
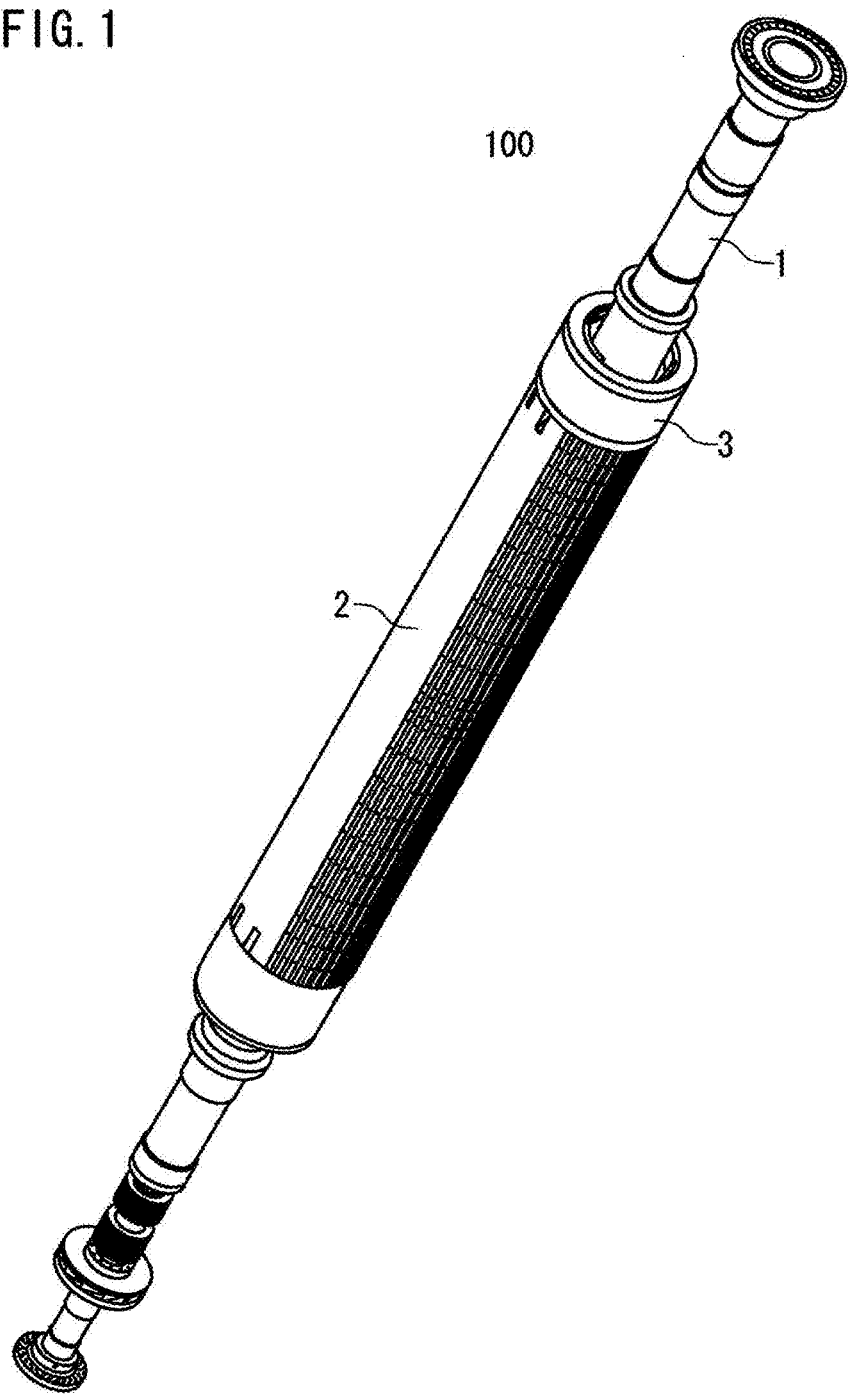
FIG. 1 is a perspective view of a rotor for a rotary electric machine according to embodiment 1.

FIG. 1 is a perspective view of a two-pole rotor 100 for a rotary electric machine.

Figure 2:
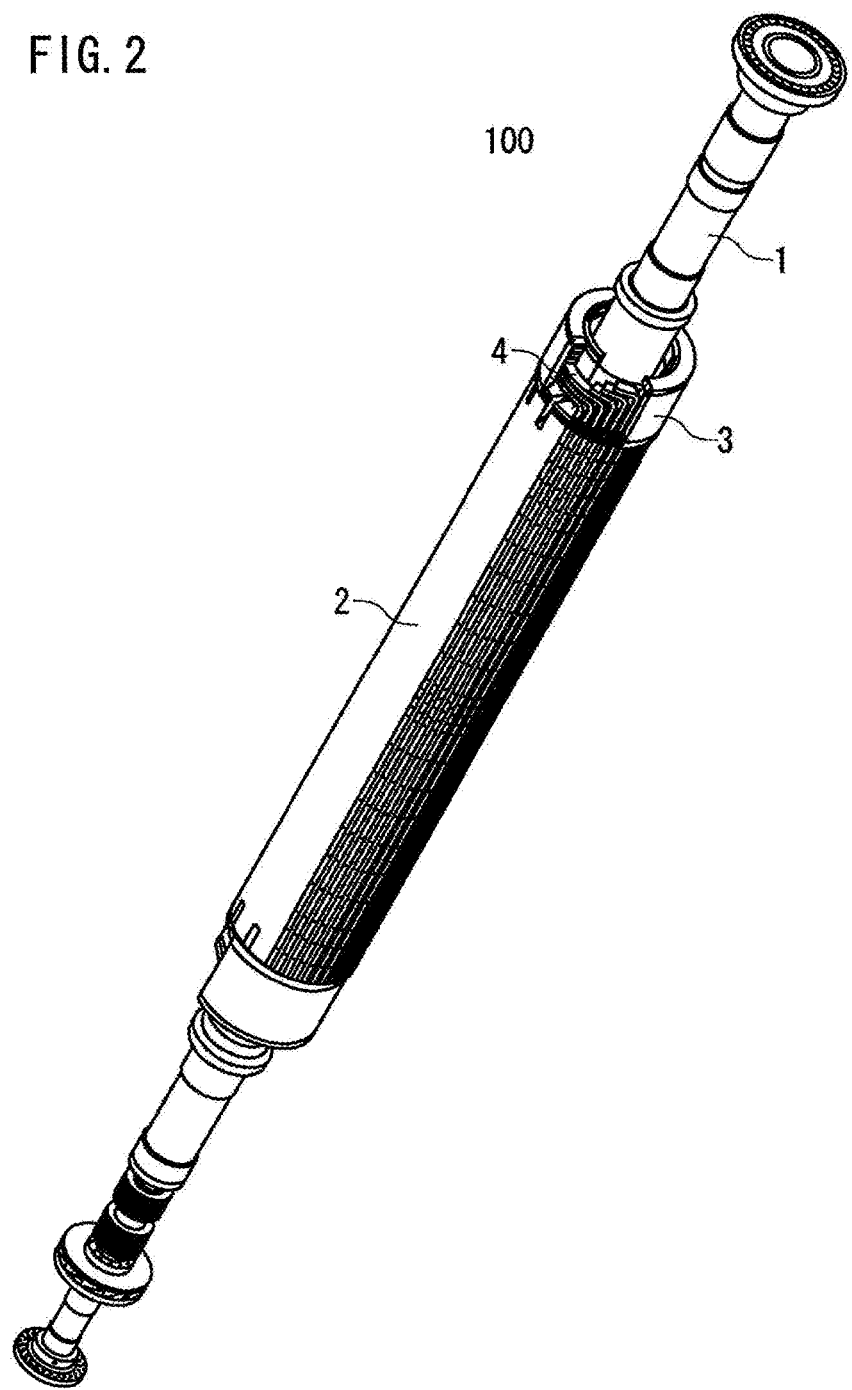
FIG. 2 is a partial cross-sectional perspective view of the rotor for a rotary electric machine according to embodiment 1.

FIG. 2 is a partial cross-sectional perspective view of the rotor 100.

The rotor 100 is composed of a shaft 1, a rotor core 2, and coils 4 as main components. Although the shaft 1 and the rotor core 2 are machined so as to be integrated with each other in the present embodiment, the rotor core may be fitted to the outer circumferential surface of the shaft 1 as a separate member.

Figure 3:
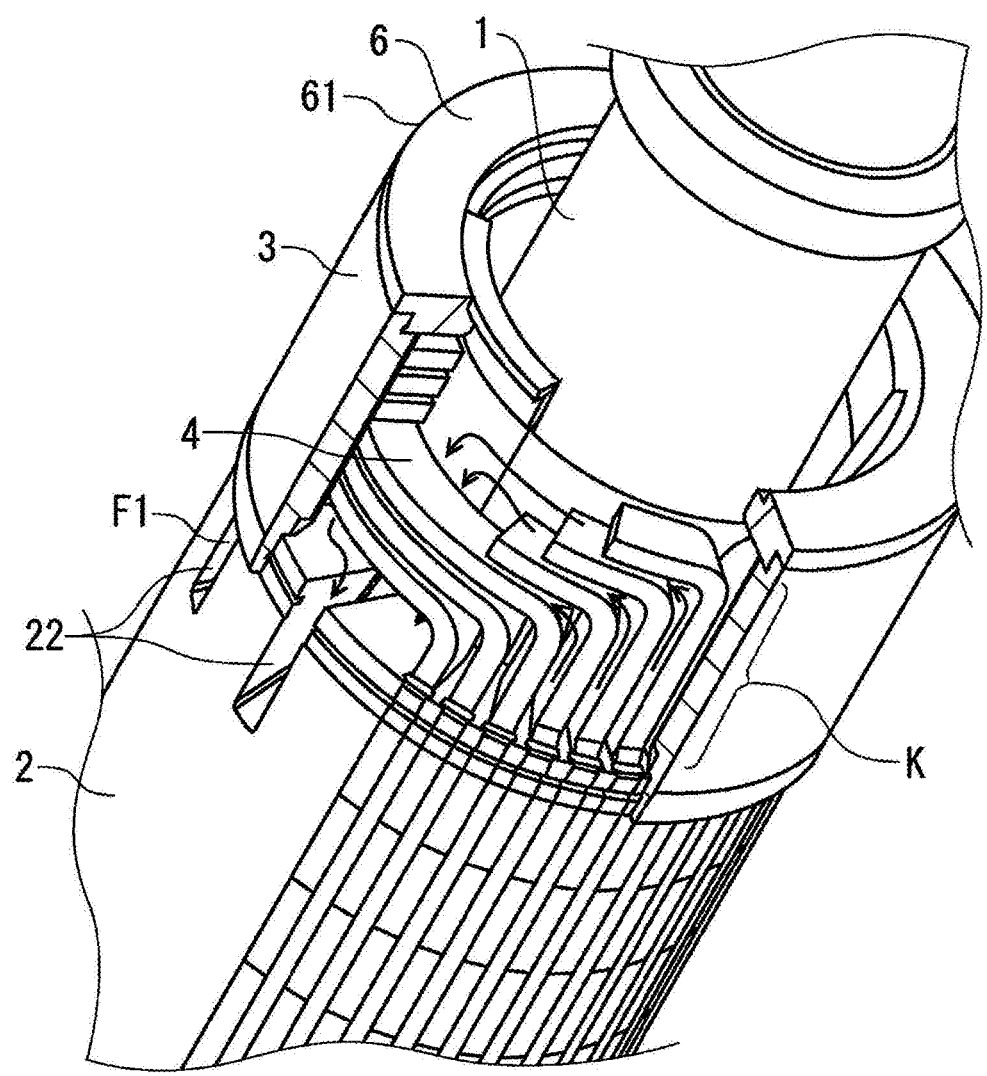
FIG. 3 is an enlarged view of a major part in FIG. 2.

FIG. 3 is an enlarged perspective view of a major part in FIG. 2.

Figure 4:
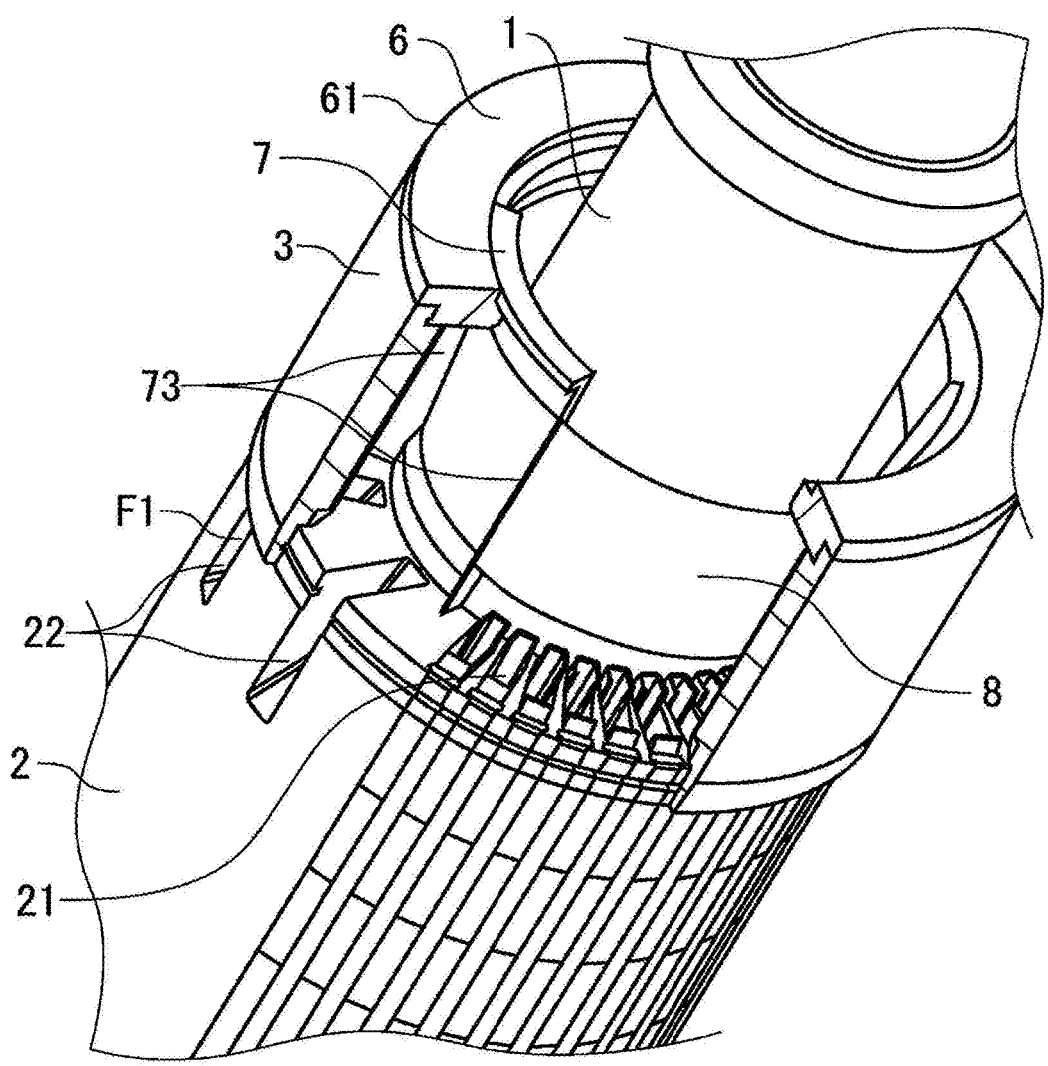
FIG. 4 is a perspective view showing a state where a coil is removed from FIG. 3.

FIG. 4 is a perspective view showing a state where a coil 4 is removed from FIG. 3.

Figure 5:
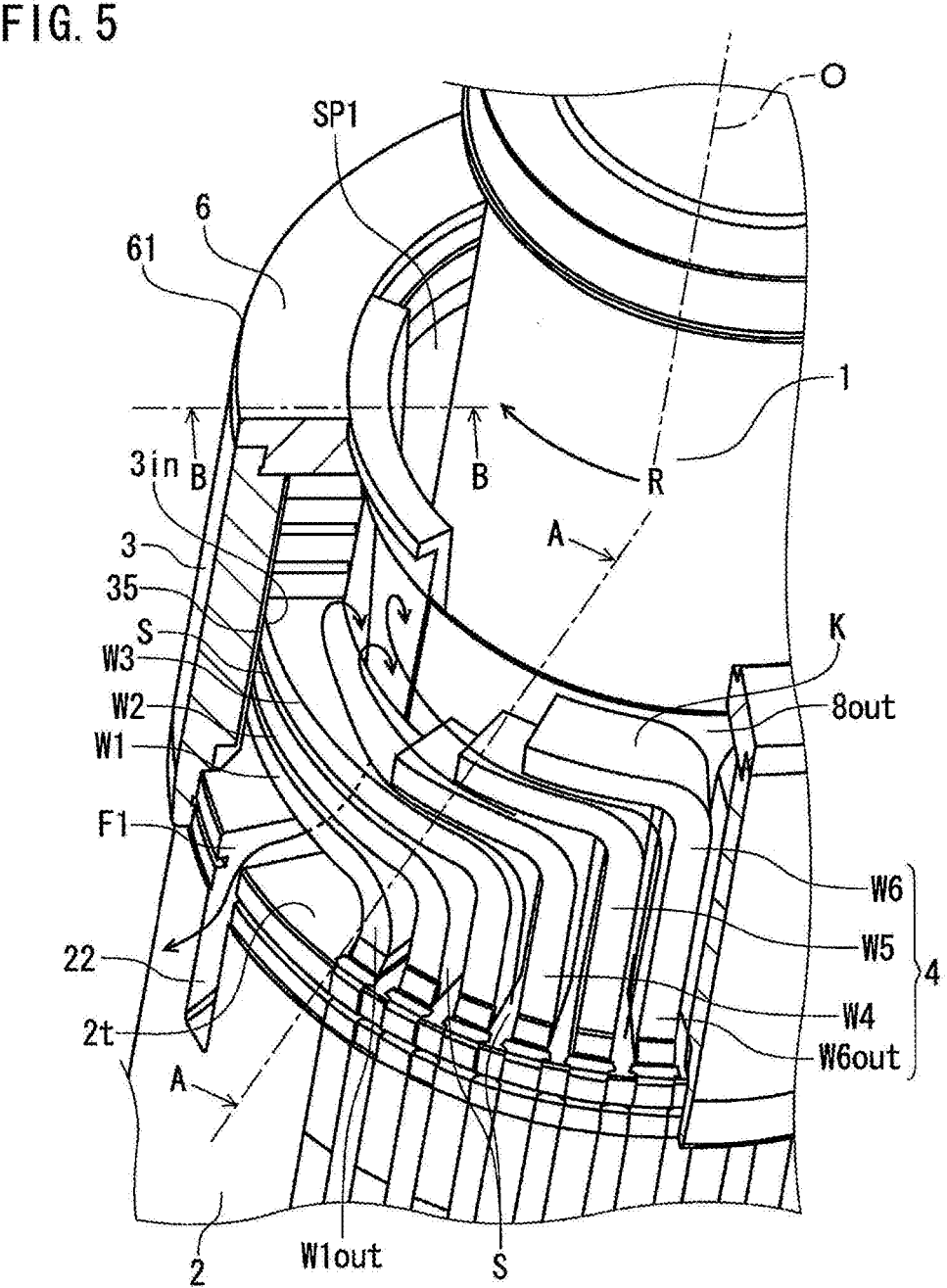
FIG. 5 is a perspective view of the major part shown in FIG. 3, as seen from a different angle.

FIG. 5 is a perspective view of the major part shown in FIG. 3, as seen from a different angle.

Figure 6:
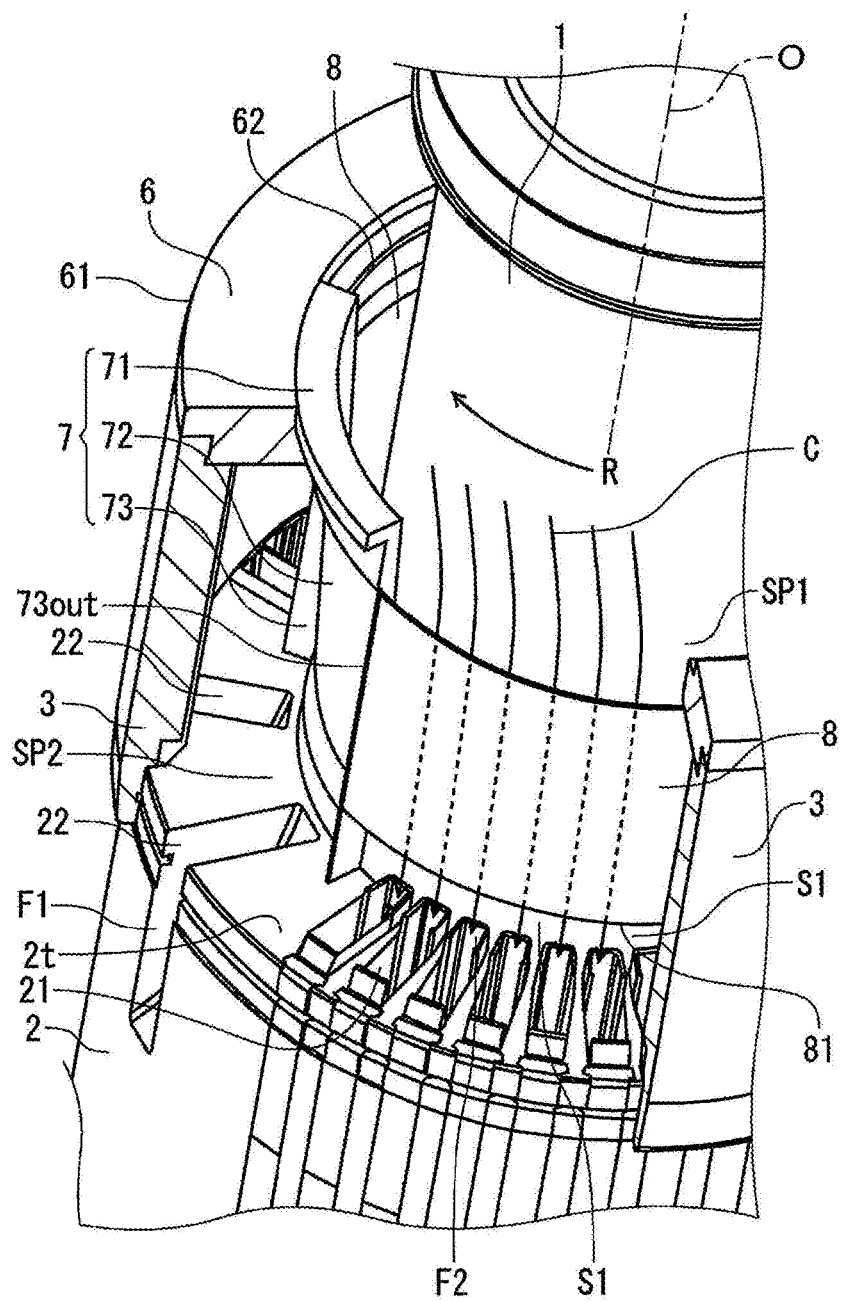
FIG. 6 is a perspective view showing a state where the coil is removed from FIG. 5.

FIG. 6 is a perspective view showing a state where the coil is removed from FIG. 5.

As shown in FIG. 4 and FIG. 6, slots 21 for inserting therein the coil 4 are formed in the rotor core 2 at intervals in the circumferential direction. Specifically, an outer circumferential portion of the rotor core 2 is provided with: slots 21 arranged side by side in the circumferential direction; and further, the same number of slots 21 located so as to be symmetric with these slots 21 about the center axis of the shaft 1. Each slot 21 is provided so as to penetrate the rotor core 2 from one end to another end thereof in the axial direction.

Notches 22 which are cut from an end surface 2t of the rotor core 2 to the outer circumferential surface thereof are interposed, in the circumferential direction, between the above-described two sets of slots 21 at an end of the rotor core 2.

The rotor 100 is a two-pole rotor, and two sets of coils 4 are incorporated in the rotor core 2. As shown in FIG. 5, a coil 4 for one pole is formed by conductors W. As the conductors W, flat wires are used. Each conductor W extends in the axial direction from the end in the axial direction of the rotor core 2 with a gap between the conductor W and a conductor W adjacent thereto, whereby an extending portion is formed. Then, the extending portion is bent by 90° in the circumferential direction and further led in the circumferential direction along the curve of the outer circumferential surface of the rotor core 2 so as to have an overlap in the axial direction with an gas space interposed, whereby a jumper portion is formed.

Here, the bottom-layer conductor W closest to the rotor core 2 among the conductors W that form the jumper portions is referred to as a conductor W1, and conductors that are located on the outer side in the axial direction of the conductor W1 are referred to as a conductor W2, a conductor W3, a conductor W4, a conductor W5, and a conductor W6 in this order. A portion composed of the above-described extending portions and jumper portions, i.e., the entire portion of the conductors W1 to W6 projecting in the axial direction from the core, is referred to as a coil end portion K. In the present specification, the jumper portions refer to portions of the conductors W1 to W6 overlapping with each other in the axial direction.

In FIG. 3 and FIG. 5, the conductors W4, W5, and W6 are illustrated as if being cut. This is because illustration thereof is partially omitted for convenience of description made below. Thus, in actuality, the conductors W4, W5, and W6 continuously extend in the circumferential direction in the same manner as the conductors W1, W2, and W3.

As shown in FIG. 5, a tubular retaining ring 3 is provided around the coil end portion K so as to cover the coil end portion K. By mounting the retaining ring 3 to the rotor core 2, the above-described notches 22 shown in FIG. 4 form first gas passages F1 penetrating from the end surface 2t of the rotor core 2 to the outer circumferential surface of the rotor core 2.

Outer circumferential surfaces W1out to W6out of the conductors W1 to W6 forming the coil end portion K extend along an inner circumferential surface 3in of the retaining ring 3 with an insulator 35 interposed therebetween. Gas spaces S are present between the conductors W1 to W6 adjacent to each other. The gas spaces S are continuously present between the extending portions, of the respective conductors W1 to W6, which extend in the axial direction from the respective slots 21, and between the jumper portions led in the circumferential direction.

Figure 7:
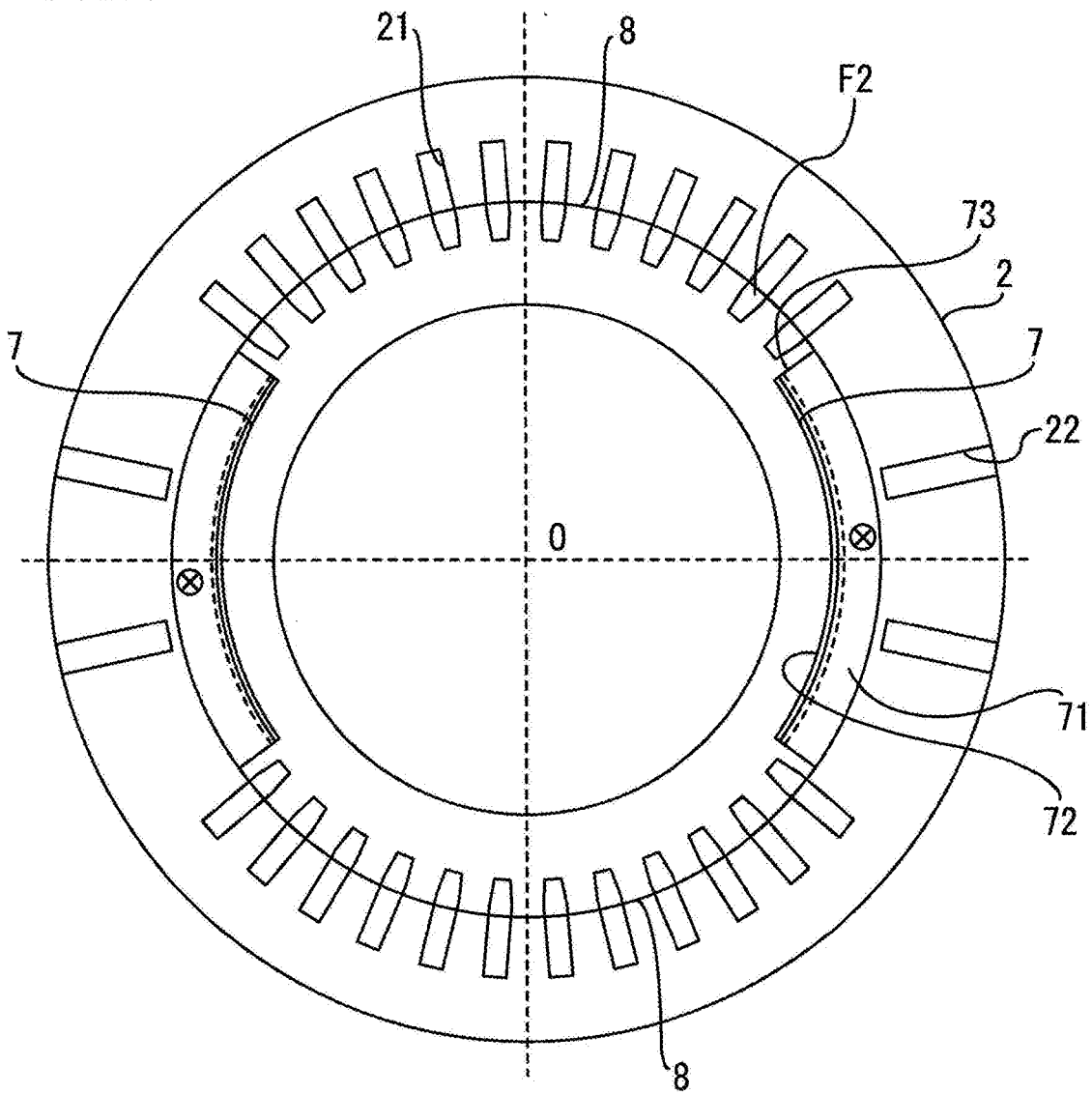
FIG. 7 is an axial view of a rotor core, rotor baffles, and insulation baffles according to embodiment 1.

As shown in FIG. 6 and FIG. 7, in actuality, the slots 21 accommodating the conductors W1 to W6 are formed so as to have larger widths in the radial direction than the width of the conductors W1 to W6. Thus, when the conductors W1 to W6 are accommodated in the slots 21, gas passages in rotor F2 (second gas passages) are formed in the axial direction along the conductors W1 to W6 on the inner side in the radial direction of the conductors W1 to W6.

Next, members that are mounted on the inner side in the radial direction of the conductors W1 to W6 and that partition the internal space of the retaining ring 3 into two spaces in the radial direction, will be described.

As shown in FIG. 5, a ring-shaped end plate 6 is mounted to an end in the axial direction of the retaining ring 3. A rim 61 on the outer circumferential side of the end plate 6 is present on the outer circumferential surface side of the retaining ring 3. A space is present in the circumferential direction between a rim 62 on the inner circumferential side of the end plate 6 and the outer circumferential surface of the shaft 1.

In a state where only the members described above are mounted, the inside enclosed by the retaining ring 3 and the end plate 6 is one large space accommodating two coil end portions K each formed by the conductors W1 to W6.

FIG. 7 is an axial view of rotor baffles 7 and insulation baffles 8 which are members partitioning the above-described internal space of the retaining ring 3 into two spaces in the radial direction. The symbols obtained by writing "+" in the mark "o" indicate that cooling gases are flowing from the near side of the drawing sheet to the far side of the drawing sheet.

Figure 8:
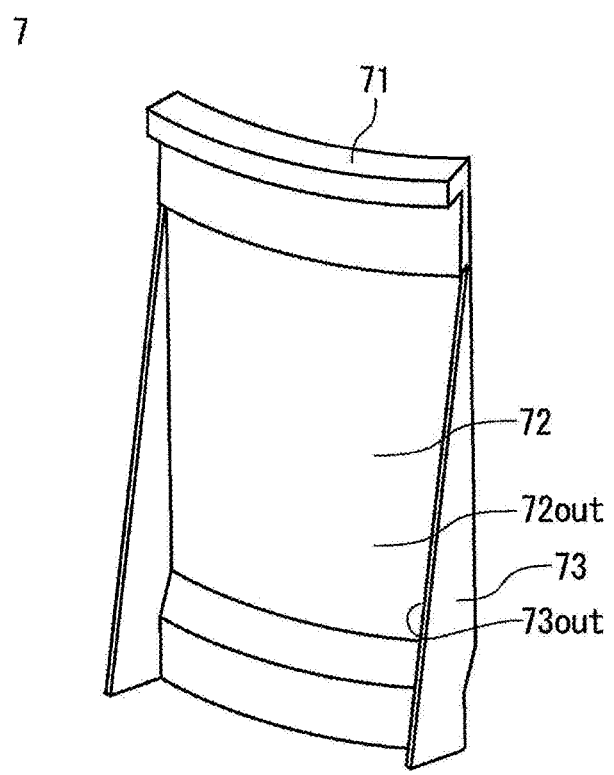
FIG. 8 is a perspective view of a rotor baffle, as seen from the outer circumferential side thereof.

FIG. 8 is a perspective view of a rotor baffle 7, as seen from the outer circumferential side thereof.

Figure 9:
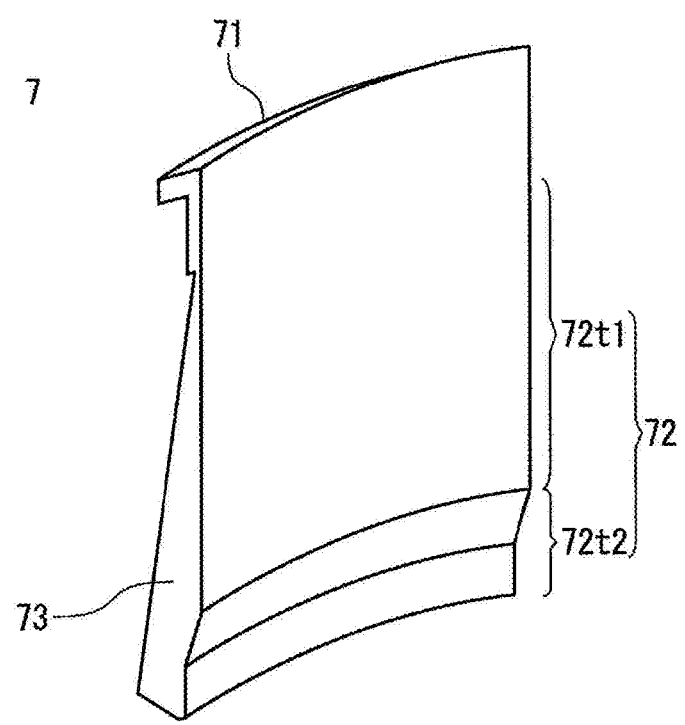
FIG. 9 is a perspective view of the rotor baffle, as seen from the inner circumferential side thereof.

FIG. 9 is a perspective view of the rotor baffle 7, as seen from the inner circumferential side thereof.

Figure 10:
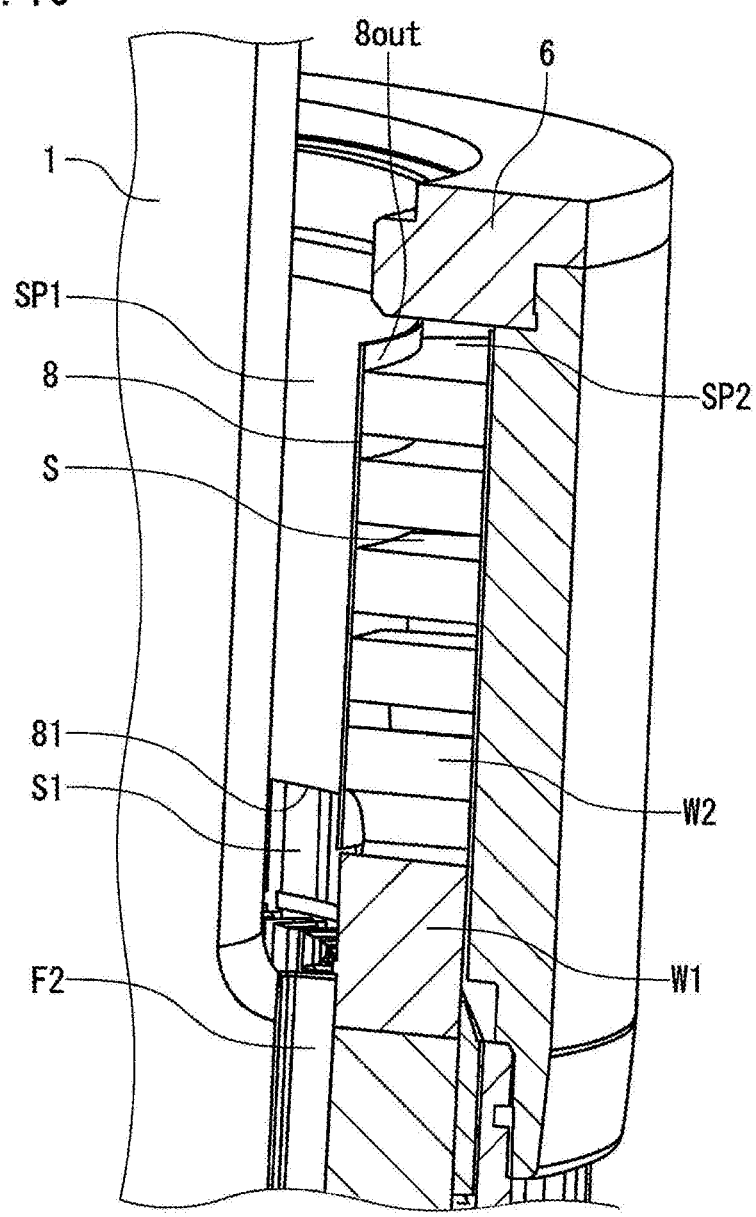
FIG. 10 is a perspective view of a major-part cross section obtained by cutting the rotor along an axial direction at the line A-A in FIG. 5.

FIG. 10 is a perspective view of a major-part cross section obtained by cutting the rotor 100 along the axial direction at the line A-A in FIG. 5.

Figure 11:
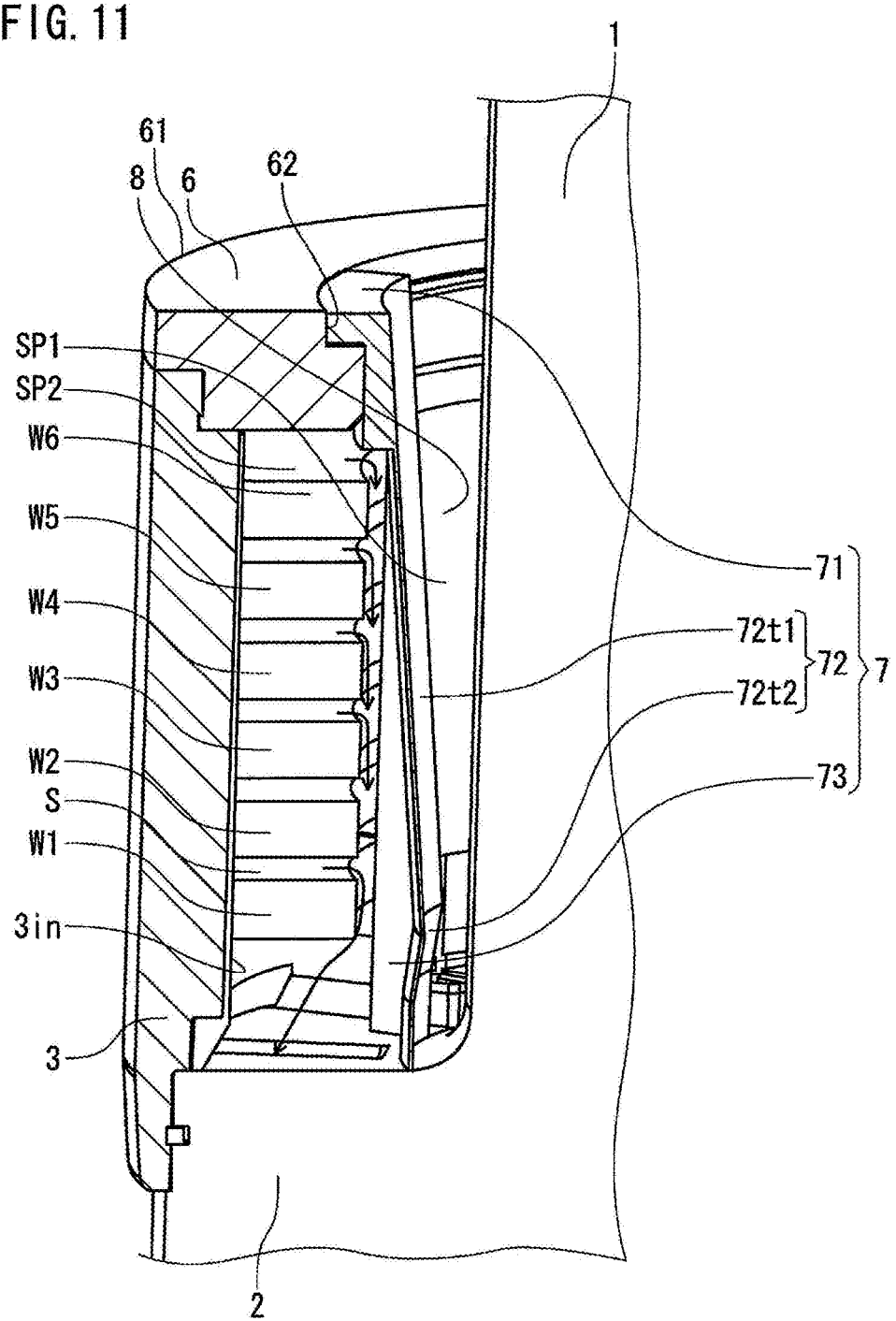
FIG. 11 is a perspective view of a major-part cross section obtained by cutting the rotor along the axial direction at the line B-B in FIG. 5.

FIG. 11 is a perspective view of a major-part cross section obtained by cutting the rotor 100 along the axial direction at the line B-B in FIG. 5.

Figure 12:
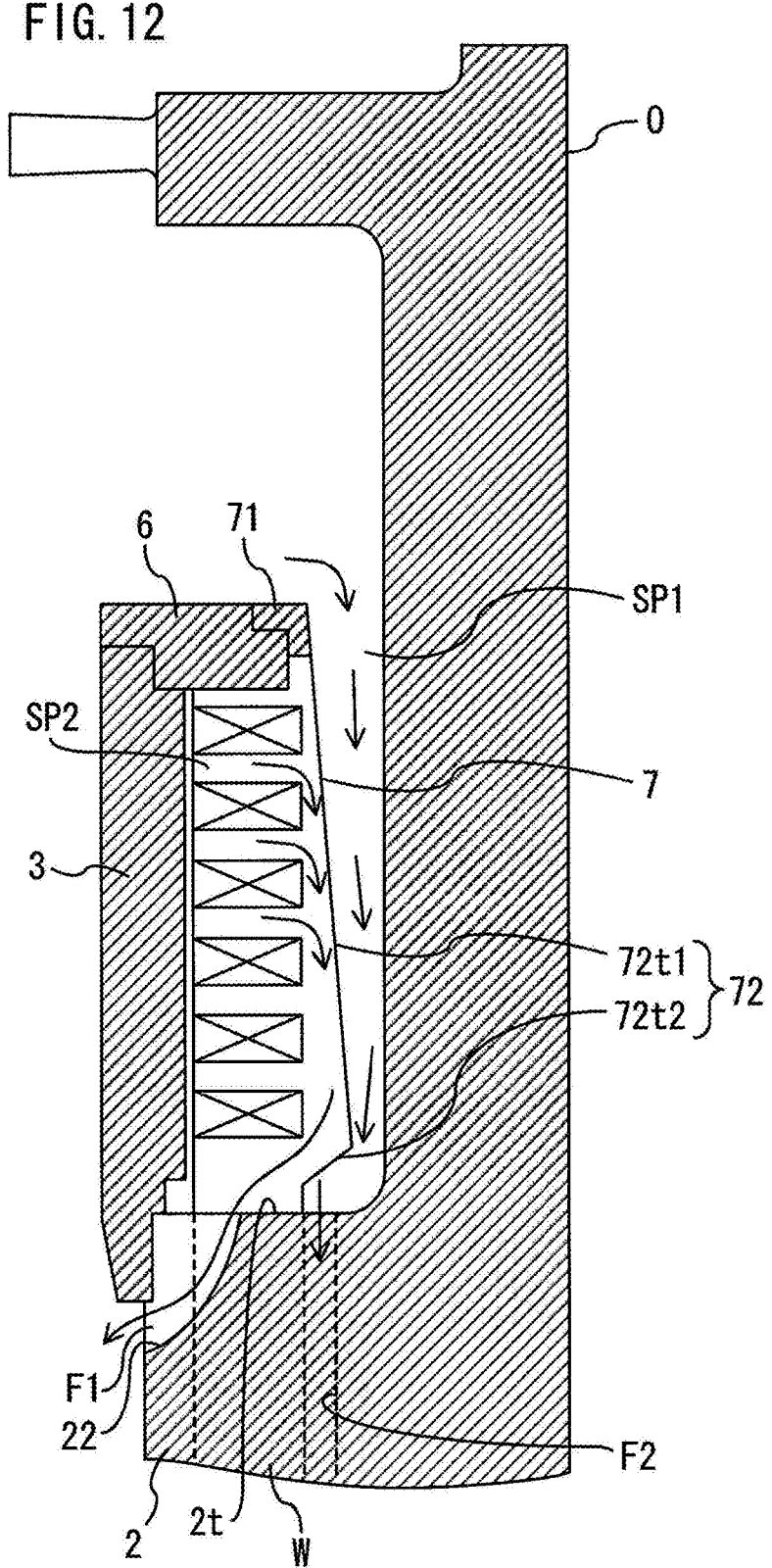
FIG. 12 is a schematic view explaining the flow of cooling gas in a first space and a second space.

FIG. 12 is a schematic view explaining the flow of cooling gas in a first space and a second space. In FIG. 12, an gas passage in rotor F2 is illustrated on the same plane. However, in actuality, the gas passages in rotor F2 and the rotor baffles 7 are in such a positional relationship as to be shifted in the circumferential direction, as shown in FIG. 7.

Each rotor baffle 7 is composed of: an arc-shaped end member 71 formed along the rim 62 on the inner circumferential side of the end plate 6; a partition wall portion 72 extending from a rim on the inner circumferential side of the end member 71 toward the center side in the axial direction to reach the end surface 2t of the rotor core 2; and partition portions 73 projecting from both ends in the circumferential direction of the partition wall portion 72 toward the outer side in the radial direction.

Accordingly, the rotor baffles 7 and the insulation baffles 8 alternately connected in the circumferential direction are provided such that the space in the retaining ring 3 is partitioned into: a first space SP1 on the inner side in the radial direction where the coil end portions K are not present; and a second space SP2 on the outer side in the radial direction where center portions in the circumferential direction of the coil end portions K are present.

As shown in the drawings, the partition wall portion 72 is curved in the circumferential direction coaxially with the center axis O of the rotor 100. A part of the partition wall portion 72, on the radially outer side of which the conductors W1 to W6 are present, has a shape tilted from an end in the axial direction of the part so as to be more apart from the conductors W1 to W6 toward the center side in the axial direction of the rotor 100. This part is referred to as a first tapered shape part 72t1.

A part of the partition wall portion 72, on the radially outer side of which the conductors W1 to W6 are not present, has a shape tilted from the end on the center side in the axial direction of the first tapered shape part 72t1 so as to be closer to the outer circumferential surface side of the rotor core 2 toward the center side in the axial direction of the rotor 100. This part is referred to as a second tapered shape part 72t2. As shown in FIG. 7, a cross-sectional shape, of each rotor baffle 7, that is perpendicular to the axial direction is a shape having linear portions extending toward the outer side in the radial direction respectively from both ends in the circumferential direction of a circular arc portion concentric with a cross section perpendicular to the axial direction of the outer circumferential surface of the rotor core 2.

The rotor baffle 7 is disposed such that: the notches 22 in the end of the rotor core 2 are present, between the two partition portions 73, on the outer side in the radial direction of the partition wall portion 72; and the partition wall portion 72 is present on the inner side in the radial direction of a portion, of the coil end portion K, at which center portions in the circumferential direction of the jumper portions are formed. The rotor baffles 7 are located so as to be symmetric with each other about the center axis of the shaft 1.

As shown in FIG. 6, ends 73out on the outer side in the radial direction of the partition portions 73 of each rotor baffle 7 are parallel to the center axis of the shaft 1 and located on the outer side in the radial direction relative to the partition wall portion 72 over the entire lengths in the axial direction of the ends 73out.

The insulation baffles 8 are provided so as to make connection between the ends 73out on the outer side in the radial direction of the partition portions 73, which are adjacent to each other in the circumferential direction, of the rotor baffles 7 located so as to be symmetric with each other about the center axis O of the shaft 1. Each insulation baffle 8 has a shape obtained by curving a rectangular sheet coaxially with the center axis O of the shaft 1. That is, a cross section, of the insulation baffle 8, that is perpendicular to the axial direction has an arc shape.

As shown in FIG. 5 and FIG. 6, the insulation baffle 8 is not in contact with the rotor core 2, and a gap S1 is formed between an end 81 on the center side in the axial direction of the insulation baffle 8 and the end surface 2t of the rotor core 2. The width in the axial direction of the gap S1 is approximately equal to the distance between the bottom surface of the jumper wire of the conductor W1 and the end surface 2t of the rotor core 2.

As shown in FIG. 6, an end on the outer side in the axial direction of the insulation baffle 8 is in contact with the bottom surface of the end plate 6. Here, a space on the inner side in the radial direction enclosed by the two rotor baffles 7, the two insulation baffles 8, the shaft 1, and the end surface 2t of the rotor core 2 which are shown in FIG. 6 and FIG. 12, is referred to as the first space SP1, and a space on the outer side in the radial direction enclosed by the two rotor baffles 7, the two insulation baffles 8, the retaining ring 3, the end surface 2t of the rotor core 2, and the end plate 6, which are shown in FIG. 6 and FIG. 12, is referred to as the second space SP2. In this case, apart from the gap S1, there is no portion, between the first space SP1 and the second space SP2, at which the two spaces are in communication with each other. The coil end portions K are present in the second space SP2.

Next, air passages through which cooling gas for cooling the rotor 100 passes will be described.

First, as described above, the first gas passages F1 are air passages formed by the notches 22 and the retaining ring 3. As shown in FIG. 5, the outer side in the axial direction of the first space SP1 is opened to the outside. Cooling gas taken in from this opening to the center side in the axial direction moves from the first space SP1 through the gap S1 formed between each insulation baffle 8 and the end surface 2t of the rotor core 2 to the second space SP2 on the outer side in the radial direction by centrifugal force.

Meanwhile, as shown in FIG. 5, end surfaces on the inner side in the radial direction of the extending portions of the conductors W1 to W6 forming the coil end portion K are in contact with an outer circumferential surface 8out of the insulation baffle 8. Thus, the cooling gases having entered the second space SP2 from the gap S1 pass through the gas spaces S interposed, in the radial direction, between the conductors W1 to W6 adjacent to each other. The cooling gases move in the radial direction first and then move in the circumferential direction. Thus, since the gas spaces S between the conductors W1 to W6 adjacent to each other extend to the outer side in the axial direction and then continuously extend to the left side in the circumferential direction, the cooling gases move as indicated by arrows.

Then, the cooling gases move beyond the boundary between the rotor baffle 7 and the insulation baffle 8 and further move to the left side in FIG. 5, and the gas spaces S between the conductors W1 to W6 adjacent to each other are in communication with a space on the inner side in the radial direction, i.e., a space on the outer circumferential side of the rotor baffle 7. Then, the cooling gases having flowed through the gas spaces S formed between the respective conductors W1 to W6 converge on the inner side in the radial direction, and the cooling gas obtained by the convergence moves downward to the center side in the axial direction, as shown in FIG. 5 and FIG. 12.

As described above, the first tapered shape part 72t1 which is a part of the partition wall portion 72, on the radially outer side of which the conductors W1 to W6 are present, has a shape tilted from the end in the axial direction of the first tapered shape part 72t1 so as to be more apart from the conductors W1 to W6 toward the center side in the axial direction of the rotor 100. Therefore, a radially inner part of the first space SP1 relative to the first tapered shape part 72t1 has a larger diameter on the outer side in the axial direction than on the center side in the axial direction. Accordingly, the cross-sectional area of an air passage at an inlet of the first space SP1 can be increased, whereby the air flow resistance of cooling gas to the first space SP1 can be reduced and the cooling gas can be smoothly taken in. In contrast, regarding a radially outer part (referred to as "gathering part") of the second space SP2 relative to the first tapered shape part 72t1, a space at the radially outer part is expanded more in the radial direction toward the center side in the axial direction.

The cooling gases having separately flowed through the gas spaces S between the conductors W1 to W6 adjacent to each other converge toward the center side in the axial direction. Thus, the amount of the flowing cooling gas is larger at a location closer to the center side in the axial direction. The first tapered shape part 72t1 has the above-described shape in order to cause the cooling gases sequentially meeting each other to smoothly flow.

Meanwhile, no conductor is present on the outer side in the radial direction of a location which is on the center side in the axial direction relative to the gathering part of the second space SP2 and at which all the cooling gases have converged. Thus, at this location, the space on the inner side in the radial direction of the partition wall portion 72 does not need to be further expanded. Therefore, in contrast, the second tapered shape part 72t2 has such a shape as to expand the first space SP1 side which is the inner side in the radial direction of the second tapered shape part 72t2.

The cooling gas obtained by convergence at the space on the outer side in the radial direction of the rotor baffle 7 is discharged from the first gas passages F1 to an gas space between the rotor 100 and a stator (not shown). In this manner, the cooling gas taken in from the first space SP1 is, from the gap S1, divided by the gas spaces S between the conductors W1 to W6 adjacent to each other in the second space SP2. The cooling gases obtained by the division pass between the conductors W1 to W6 and converge at the gathering part on the outer side in the radial direction of the rotor baffle 7. Then, the cooling gas obtained by the convergence is discharged to the outside. In this manner, cooling can be efficiently performed for heat generated at each coil end portion K.

Next, the flow of cooling gas to the gas passages in rotor F2 for cooling the rotor core 2 and the conductors W1 to W6 in the rotor core 2 will be described.

As shown in FIG. 7, an intake port of each gas passage in rotor F2 (second gas passage) is opened to the outer side in the axial direction on the inner side in the radial direction relative to the insulation baffle 8. Here, if the rotor 100 is assumed to be rotating in a rotation direction R indicated by the arrow in FIG. 6, cooling gas is taken in from the outer side in the axial direction to the first space SP1 as indicated by the arrow C, a part of the cooling gas directly flows into the gas passage in rotor F2, and the rest of the cooling gas enters the gas spaces S between the conductors W1 to W6 from the gap S1 as described above.

In actuality, cooling gas flows into the gas passage in rotor F2 also from the end of the rotor 100 shown in FIG. 6 and an end on the opposite side in the axial direction shown in FIG. 1. By centrifugal force, the cooling gases having flowed into the gas passage in rotor F2 from both end sides in the axial direction pass through cooling holes (not shown) for the conductors W1 to W6 and are discharged to an air gap between the rotor 100 and the stator (not shown).

In addition, the gas passages in rotor F2 extend along the conductors W1 to W6 inside the rotor core 2. Thus, it is possible to efficiently cool: portions, of the coils 4 as heat sources, that are accommodated in the slots 21; and the rotor core 2 around the portions.

In Patent Document 1, a portion corresponding to the first space SP1 in the present disclosure is divided in the circumferential direction, and the spaces are not in communication with each other over the entire circumference, and thus a problem arises in that, on the delayed side (the portion corresponding to the side where there is a slot 21 accommodating the conductor W1, in FIG. 5 and FIG. 6) in the rotation direction of each rotor baffle, separation of cooling gas occurs and the cooling gas cannot be sufficiently supplied to the gas passages in rotor F2. However, regarding the rotor baffles 7 according to the present embodiment, since the first space SP1 is present within the retaining ring 3 over the entire circumference around the shaft 1, separation of cooling air is suppressed on the delayed side in the rotation direction of each rotor baffle 7, whereby sufficient cooling gas can be supplied into all the gas passages in rotor F2.

In the rotor for a rotary electric machine according to embodiment 1, the first space SP1 is present within the retaining ring 3 over the entire circumference around the shaft 1 of the rotor 100. Thus, separation of cooling air is suppressed on the delayed side in the rotation direction of the rotor baffle 7, whereby sufficient cooling gas can be supplied into all the gas passages in rotor F2. Accordingly, a rotor 100 for a rotary electric machine having excellent cooling efficiency can be provided.

In addition, the first tapered shape part 72t1 of the rotor baffle 7 has a shape tilted from the end in the axial direction of the first tapered shape part 72t1 so as to be more apart from the conductors W1 to W6 toward the center side in the axial direction of the rotor 100. Thus, the cross-sectional area of the air passage at the inlet of the first space SP1 can be increased, whereby the air flow resistance of cooling gas to the first space SP1 can be reduced and the cooling gas can be smoothly taken in.

In addition, regarding the radially outer part (gathering part) of the second space SP2 relative to the first tapered shape part 72t1, the space at the radially outer part is expanded more in the radial direction toward the center side in the axial direction. Accordingly, cooling gas having gathered at the gathering part through the plurality of gas spaces S between the conductors W1 to W6 can be efficiently discharged to the first gas passages F1.

Hereinafter, a rotor for a rotary electric machine according to embodiment 2 will be described focusing on differences from embodiment 1.

Figure 13:
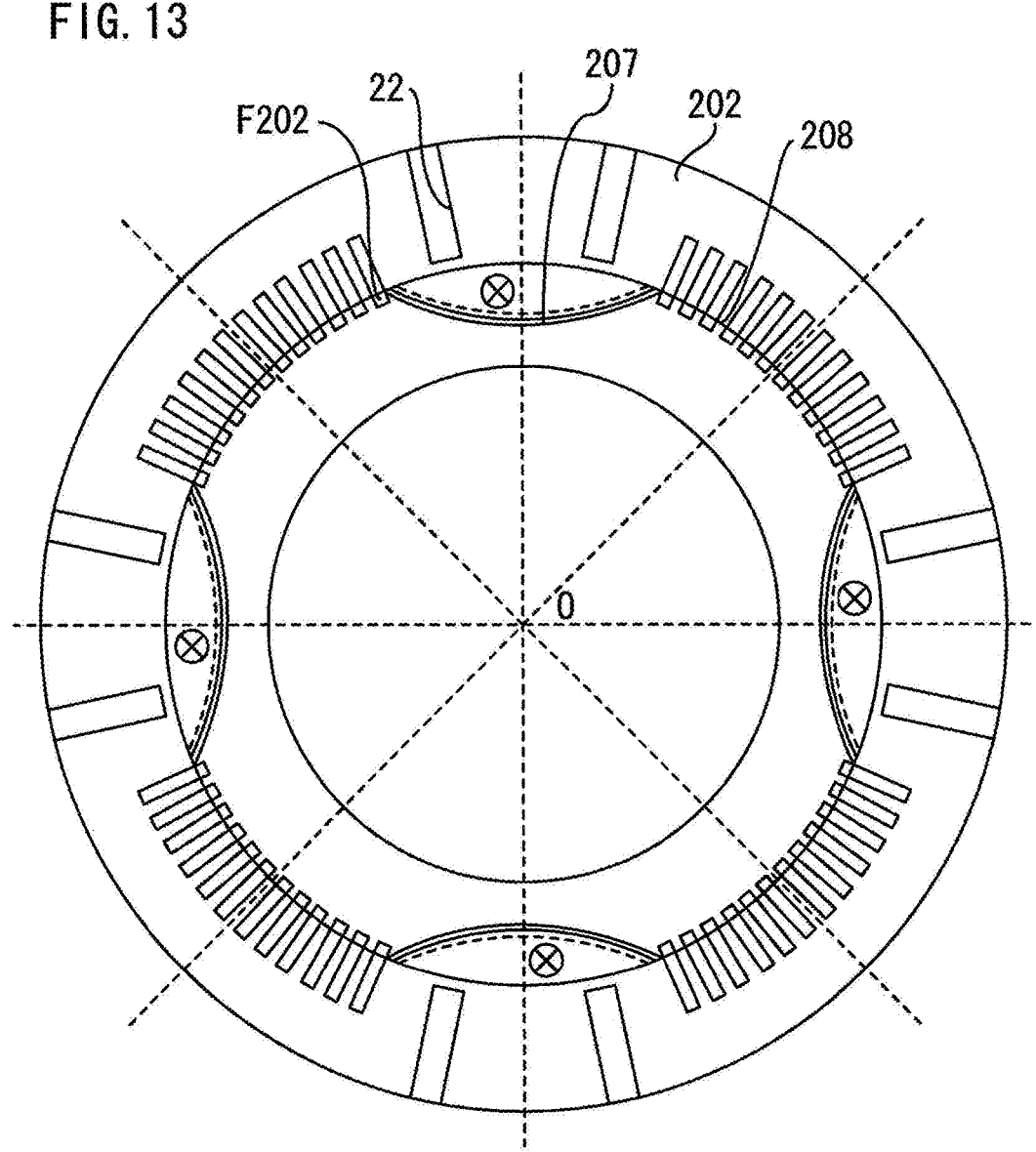
FIG. 13 is an axial view of a rotor core, rotor baffles, and insulation baffles according to embodiment 2.

FIG. 13 is an axial view of a rotor core 202, rotor baffles 207, and insulation baffles 208.

Embodiment 1 has been described using the two-pole rotor, and thus the two rotor baffles 7 and the two insulation baffles 8 are provided per end. Meanwhile, the present embodiment will be described using a four-pole rotor, and thus the number of the rotor baffles 207 and the number of the insulation baffles 208 are each four per end.

In the present embodiment, the cross-sectional shape, of each rotor baffle 207, that is perpendicular to the axial direction is a circular arc shape projecting to the inner side in the radial direction. Although the shape of the rotor baffle 207 is tapered in the axial direction in the same manner as in embodiment 1, the rotor baffle 207 does not include the partition portions 73 projecting in the radial direction, which are used for the rotor baffle 7 in embodiment 1. Thus, at connection portions between the rotor baffles 207 and the insulation baffles 208, connections therebetween are diagonally made in the circumferential direction.

In the rotor for a rotary electric machine according to embodiment 2, the rotor baffles 207 and the insulation baffles 208 can be gently connected to each other in the circumferential direction at mutual connection portions. Therefore, the flow of cooling gas into the gas passages in rotor F202 and the flow of cooling gas into the second space from the gaps S1 between the insulation baffles 208 and the rotor core 202, can be made smooth. Accordingly, the cooling efficiency of the rotor can be improved.

Hereinafter, a rotor for a rotary electric machine according to embodiment 3 will be described focusing on differences from embodiment 2.

Figure 14:
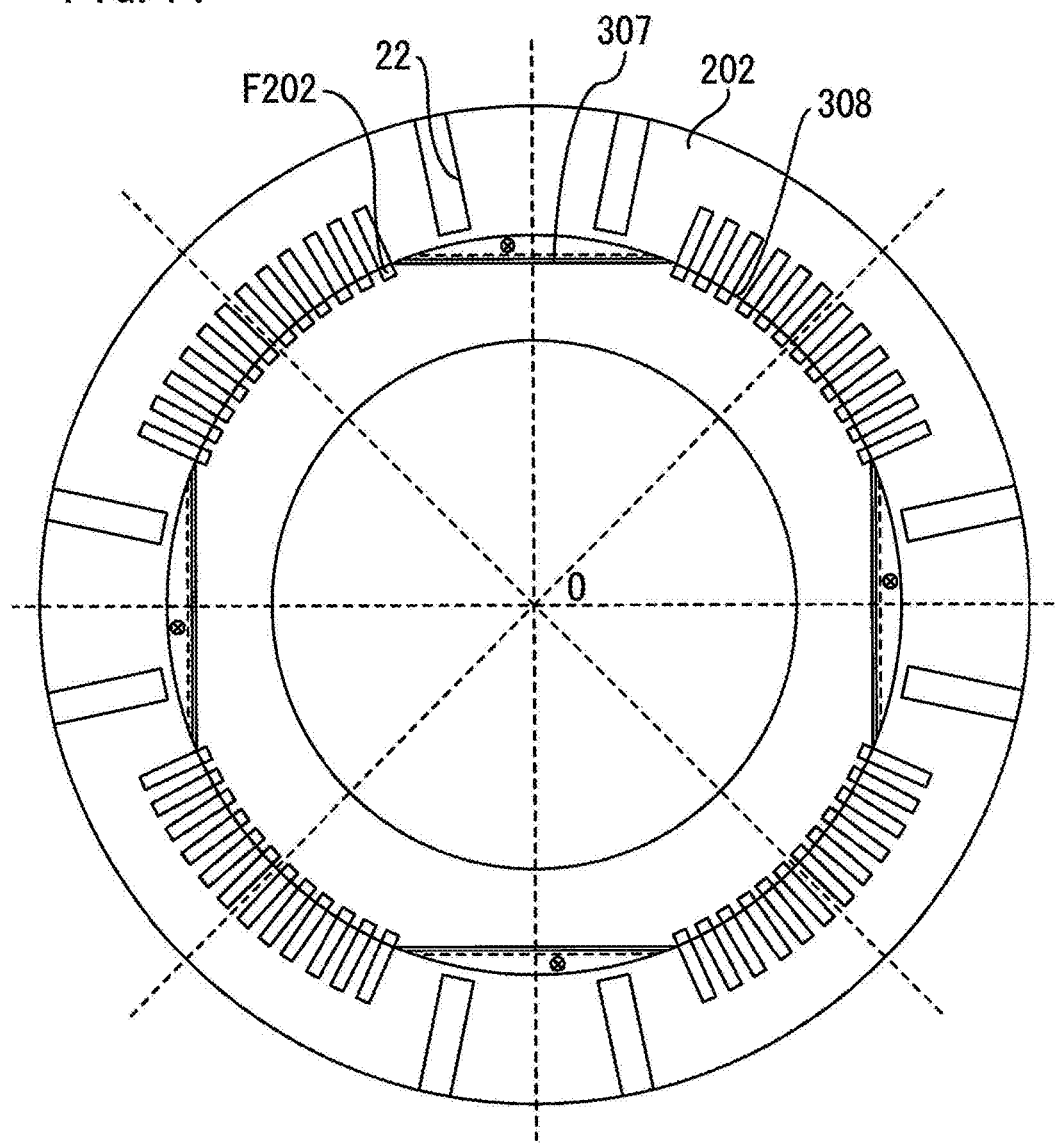
FIG. 14 is an axial view of the rotor core, rotor baffles, and insulation baffles according to embodiment 3.

FIG. 14 is an axial view of the rotor core 202, rotor baffles 307, and insulation baffles 308.

In the present embodiment, the cross-sectional shape, of each rotor baffle 307, that is perpendicular to the axial direction is a linear shape. Although the shape of the rotor baffle 307 is tapered in the axial direction (tilted with respect to the center axis which is a rotation axis in the present embodiment) in the same manner as in embodiment 1, the rotor baffle 307 does not include the partition portions in the same manner that the rotor baffle 207 in embodiment 2 does not include the partition portions. Thus, at connection portions between the rotor baffles 307 and the insulation baffles 308, connections therebetween are diagonally made in the circumferential direction.

The rotor for a rotary electric machine according to embodiment 3 enables, in addition to exhibition of the same advantageous effects as those in embodiment 2, simplification of the configuration of the rotor baffle 307, whereby manufacturing cost for the rotor can be reduced.

Hereinafter, a rotor for a rotary electric machine according to embodiment 4 will be described focusing on differences from embodiment 2.

Figure 15:
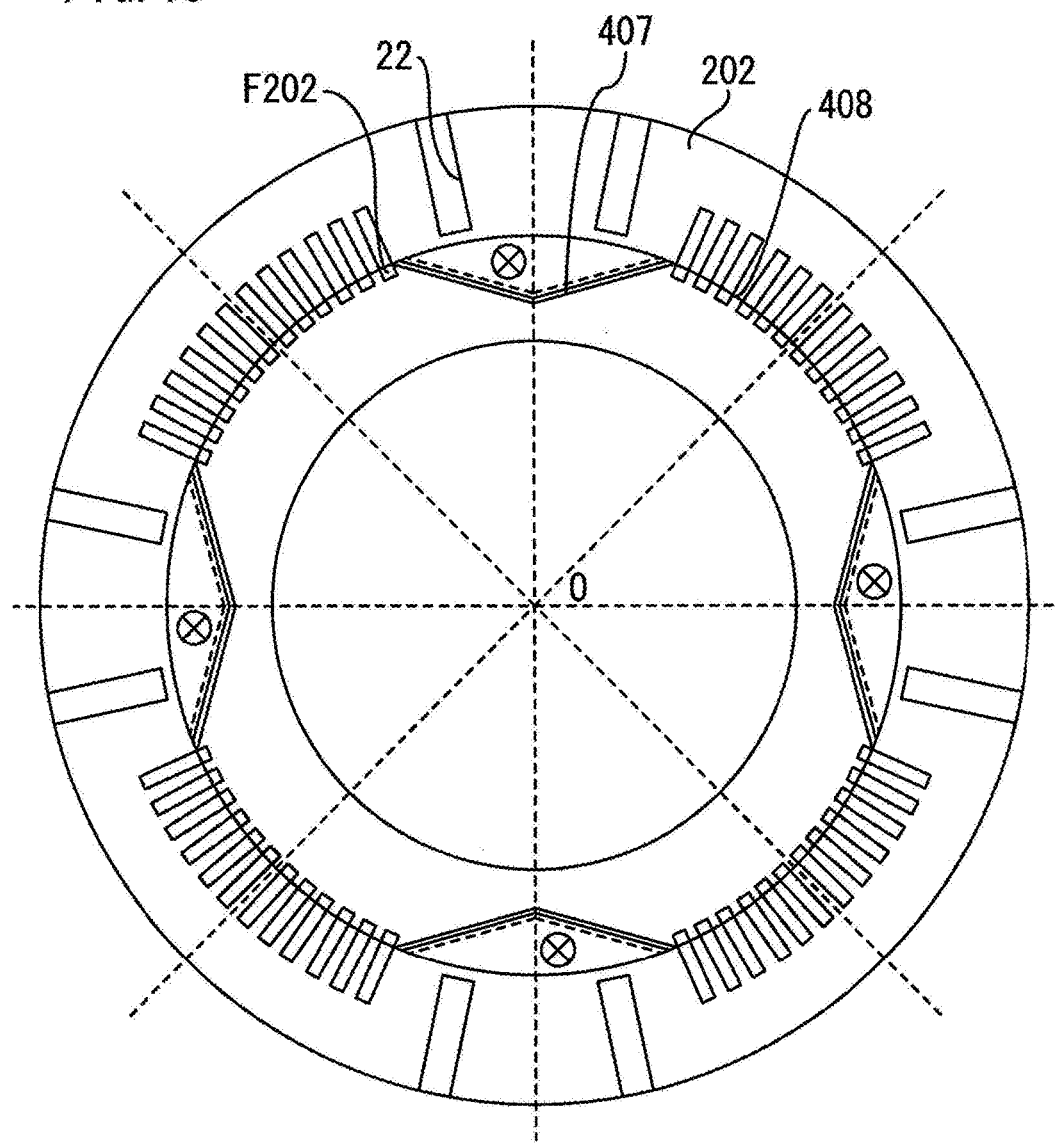
FIG. 15 is an axial view of the rotor core, rotor baffles, and insulation baffles according to embodiment 4.

FIG. 15 is an axial view of the rotor core 202, rotor baffles 407, and insulation baffles 408.

In the present embodiment, the cross-sectional shape, of each rotor baffle 407, that is perpendicular to the axial direction is a mountain-like shape projecting to the inner side in the radial direction. Although the shape of the rotor baffle 407 is tapered in the axial direction in the same manner as in embodiment 1, the rotor baffle 407 does not include the partition portions in the same manner that the rotor baffle 207 in embodiment 2 does not include the partition portions. Thus, at connection portions between the rotor baffles 407 and the insulation baffles 408, connections therebetween are diagonally made in the circumferential direction.

The rotor for a rotary electric machine according to embodiment 4 enables, in addition to exhibition of the same advantageous effects as those in embodiment 2, simplification of the configuration of the rotor baffle 407, whereby it is possible to improve the cooling efficiency of the rotor while reducing manufacturing cost for the rotor.

Hereinafter, a rotor for a rotary electric machine according to embodiment 5 will be described focusing on differences from embodiment 2.

Figure 16:
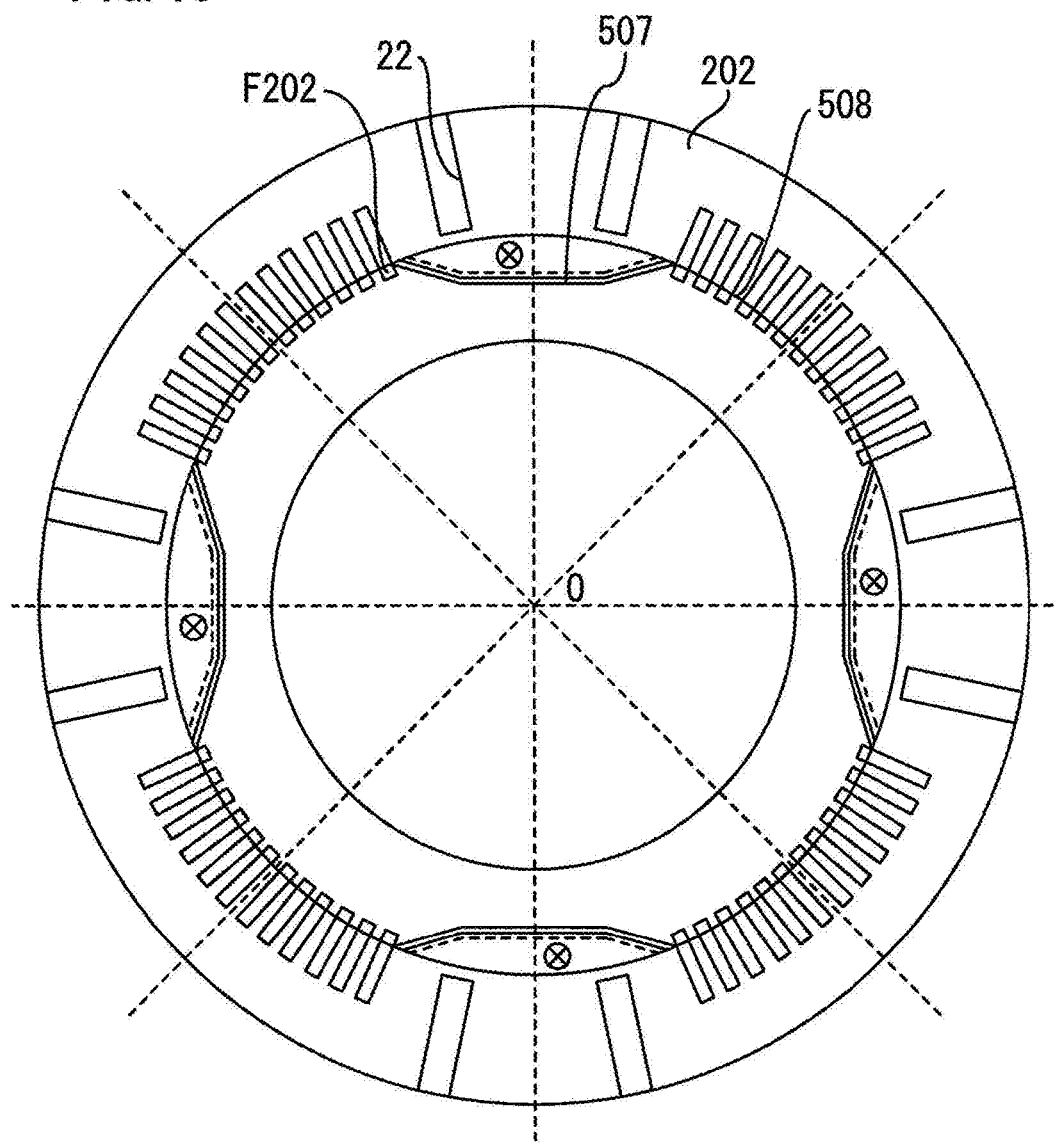
FIG. 16 is an axial view of the rotor core, rotor baffles, and insulation baffles according to embodiment 5.

FIG. 16 is an axial view of the rotor core 202, rotor baffles 507, and insulation baffles 508.

In the present embodiment, the cross-sectional shape, of each rotor baffle 507, that is perpendicular to the axial direction is a trapezoidal shape projecting to the inner side in the radial direction. Although the shape of the rotor baffle 507 is tapered in the axial direction in the same manner as in embodiment 1, the rotor baffle 507 does not include the partition portions in the same manner that the rotor baffle 207 in embodiment 2 does not include the partition portions. Thus, at connection portions between the rotor baffles 507 and the insulation baffles 508, connections therebetween are diagonally made in the circumferential direction.

The rotor for a rotary electric machine according to embodiment 5 enables, in addition to exhibition of the same advantageous effects as those in embodiment 2, simplification of the configuration of the rotor baffle 507, whereby it is possible to improve the cooling efficiency of the rotor while reducing manufacturing cost for the rotor.

Hereinafter, a rotor for a rotary electric machine according to embodiment 6 will be described focusing on differences from embodiment 2.

Figure 17:
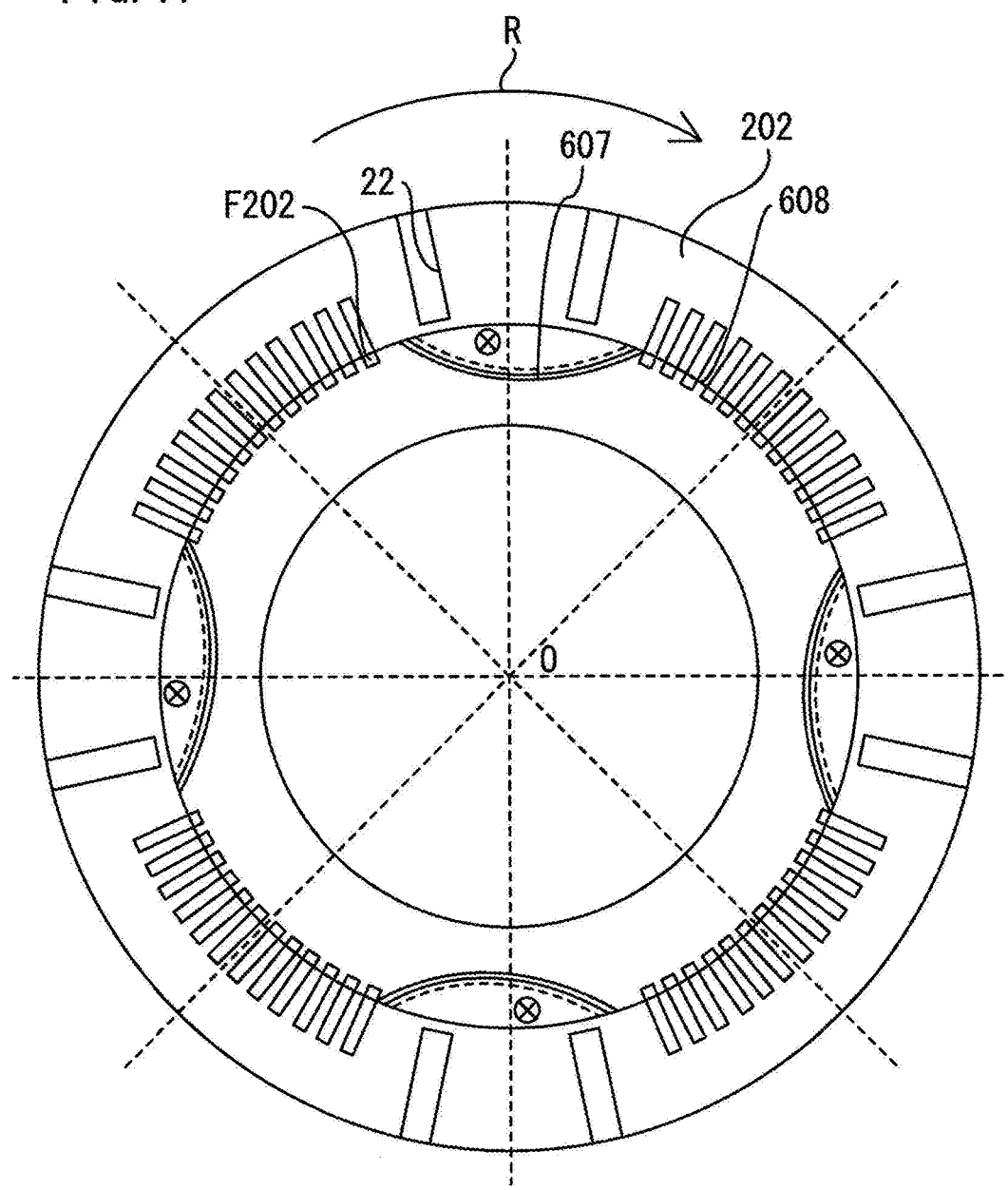
FIG. 17 is an axial view of the rotor core, rotor baffles, and insulation baffles according to embodiment 6.

FIG. 17 is an axial view of the rotor core 202, rotor baffles 607, and insulation baffles 608.

The shape of each rotor baffle 607 is the same as the shape of the rotor baffle 207 described in embodiment 2. In embodiment 2, each rotor baffle 207 is regularly disposed on the inner side in the radial direction of the two notches 22 with respect to the corresponding coil end portion K (not shown). Meanwhile, in the present embodiment, each rotor baffle 607 is disposed so as to be shifted to the downstream side in rotation direction in the rotation direction R of the rotor with respect to the corresponding coil end portion K, and an interval is provided between the upstream side in rotation direction of the rotor baffle 607 and an gas passage in rotor F202 that is adjacent thereto on the further upstream side in rotation direction.

In the rotor for a rotary electric machine according to embodiment 6, the rotor baffle 607 is located so as to be shifted to the front side of rotation of the rotor with respect to the coil end portion, and thus the rotor enables, in addition to exhibition of the same advantageous effects as those in embodiment 2, smooth intake of cooling gas into the gas passage in rotor F202 by avoiding influence of separation of the cooling gas on the upstream side in rotation direction of the rotor baffle. Accordingly, the cooling efficiency of the rotor can be improved.

The disposition to shift the rotor baffle in the circumferential direction can be employed also in the other embodiments.

Hereinafter, a rotor for a rotary electric machine according to embodiment 7 will be described focusing on differences from embodiments 1 to 6.

Figure 18:
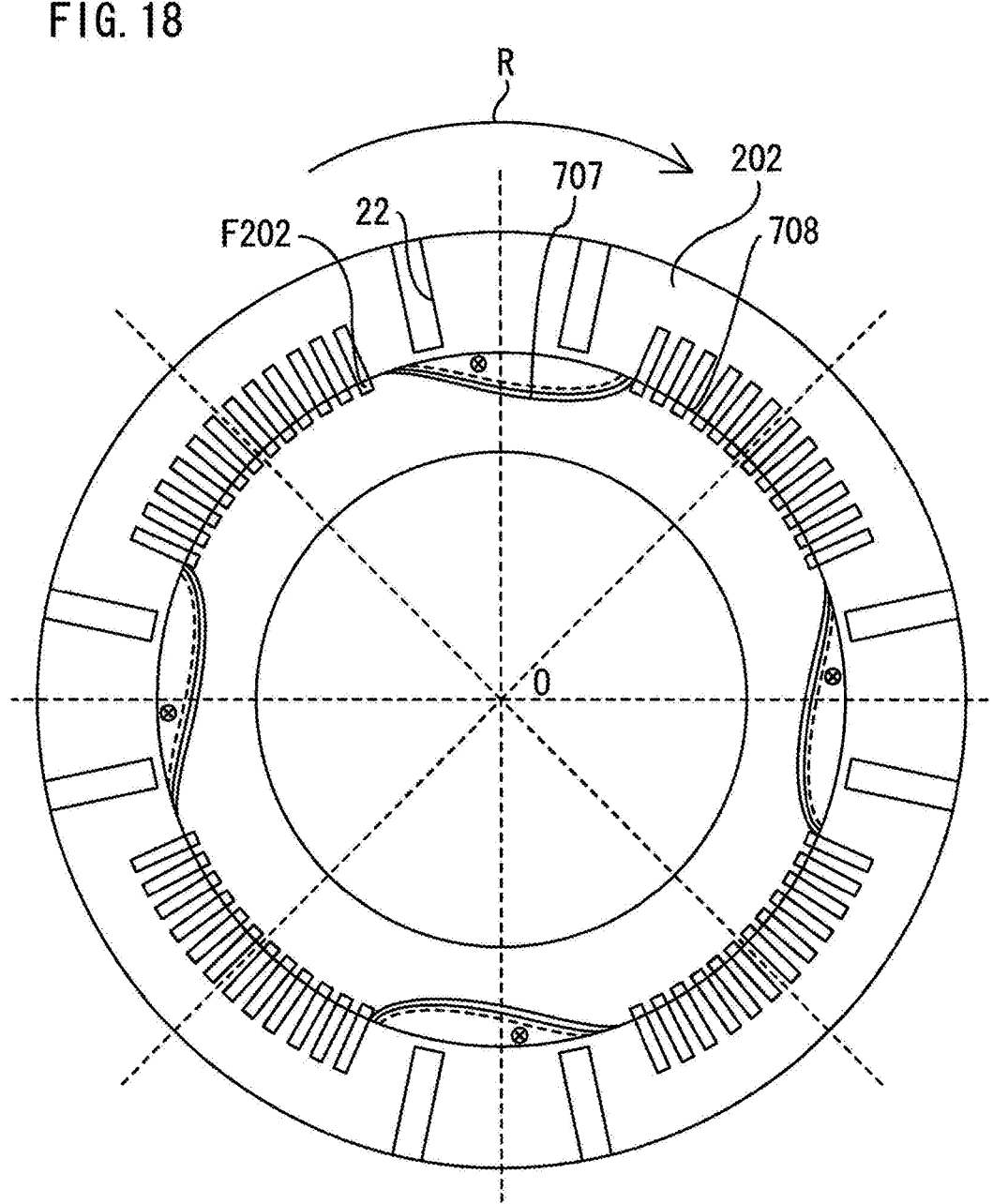
FIG. 18 is an axial view of the rotor core, rotor baffles, and insulation baffles according to embodiment 7.

FIG. 18 is an axial view of the rotor core 202, rotor baffles 707, and insulation baffles 708.

The cross-sectional shape, of each rotor baffle 607, that is perpendicular to the axial direction is a wing shape projecting to the inner side in the radial direction and protruding further to the inner side in the radial direction on the downstream side in rotation direction than on the upstream side in rotation direction, in the rotation direction R of the rotor.

In the rotor for a rotary electric machine according to embodiment 7, the cross section of the rotor baffle 707 has a wing shape protruding further to the inner side in the radial direction on the front side of rotation of the rotor, and thus separation of cooling gas on the upstream side in rotation direction of the rotor baffle 707 can be effectively prevented. Accordingly, the cooling efficiency of the rotor can be improved.

Hereinafter, a rotor for a rotary electric machine according to embodiment 8 will be described focusing on differences from embodiments 2 to 7.

Figure 19:
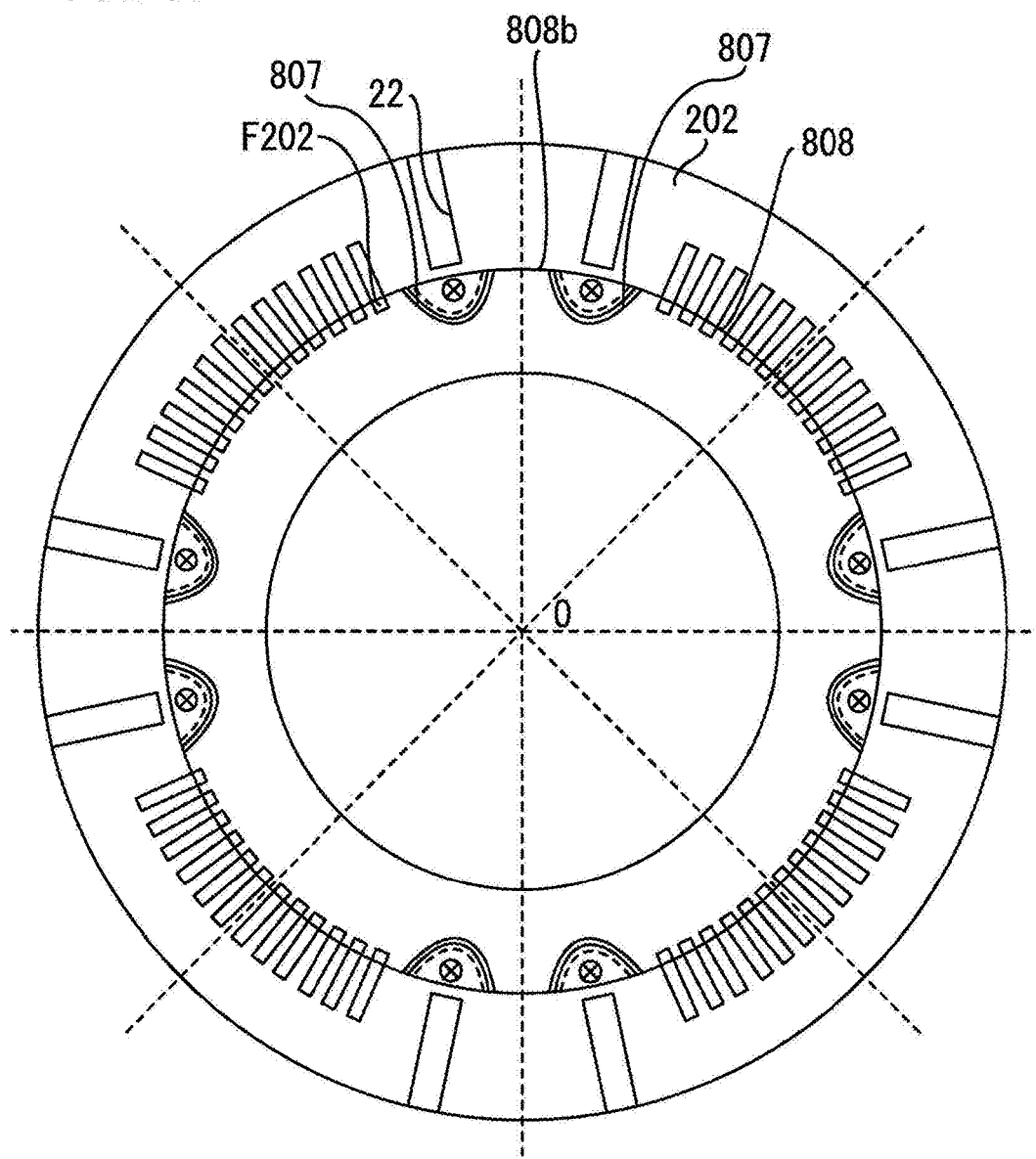
FIG. 19 is an axial view of the rotor core, rotor baffles, and insulation baffles according to embodiment 8.

FIG. 19 is an axial view of the rotor core 202, rotor baffles 807, and insulation baffles 808.

In the embodiments described thus far, one rotor baffle is provided on the inner side in the radial direction of the jumper portions of each coil. Meanwhile, in the present embodiment, each rotor baffle 807 is individually provided on the inner side in the radial direction of the corresponding notch 22. Thus, two rotor baffles 807 are provided on the inner side in the radial direction of the jumper portions of one coil, and a second insulation baffle 808b is provided between the two rotor baffles 807. In this manner, the rotor baffle does not need to be a single member, and a plurality of separated rotor baffles may also be used to exhibit the same advantageous effects as those in each embodiment.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 100 rotor
1 shaft
2, 202 rotor core
2t end surface
21 slot
22 notch
3 retaining ring
3in inner circumferential surface
4 coil
6 end plate
61, 62 rim
7, 207, 307, 407, 507, 607, 707, 807 rotor baffle
71 end member
72 partition wall portion
72t1 first tapered shape part
72t2 second tapered shape part
73 partition portion
73out end
8, 208, 308, 408, 508, 608, 708, 808 insulation baffle
8out outer circumferential surface
808b second insulation baffle
81 end
C arrow
K coil end portion
O center axis
R rotation direction
S gas space
F1 first gas passage
F2, F202 gas passage in rotor (second gas passage)
S1 gap
W1 to W6 conductor
W1out, W6out outer circumferential surface
SP1 first space
SP2 second space
35 insulator

The invention claimed is:

1. A rotor for a rotary electric machine, the rotor including a shaft, a rotor core, and coils incorporated in slots of the rotor core, the rotor comprising:
   a tubular retaining ring opened on an outer side thereof in an axial direction and covering a coil end portion of each coil; and
   rotor baffles and insulation baffles alternately connected in a circumferential direction and partitioning a space in the retaining ring into a first space on an inner side in a radial direction where the coil end portion is not present, and a second space on an outer side in the radial direction where a center portion in the circumferential direction of the coil end portion is present, wherein each rotor baffle is disposed on an inner side in the radial direction of a portion, of the corresponding coil end portion, at which a jumper portion is formed, the insulation baffles are disposed along end surfaces on an inner side in the radial direction of extending portions of a plurality of conductors forming the coil end portions, a gap is present between an end surface of the rotor core and an end, on a center side of the rotor, of each insulation baffle, the first space is formed over an entire circumference around the shaft, and the rotor baffle includes, at a part thereof on a radially outer side of which the jumper portion is present, a first tapered shape part tilted so as to be more apart from the jumper portion toward a center side in the axial direction of the rotor.

2. The rotor for a rotary electric machine according to claim 1, wherein the first tapered shape part is disposed such that the first space has a larger diameter on an outer side in the axial direction than on the center side in the axial direction.

3. The rotor for a rotary electric machine according to claim 2, wherein each rotor baffle includes a second tapered shape part tilted from an end on the center side in the axial direction of the first tapered shape part so as to be closer to an outer circumferential surface side of the rotor core toward the center side in the axial direction of the rotor.

4. The rotor for a rotary electric machine according to claim 3, the rotor further comprising:
a first gas passage which is provided on an outer side in the radial direction of each rotor baffle and through which gas in the second space is discharged to outside; and
a second gas passage extending in the axial direction and provided on an inner side in the radial direction of each of the conductors forming the coils inserted in the slots.

5. The rotor for a rotary electric machine according to claim 4, wherein, at the jumper portion, the plurality of conductors overlap with each other in the axial direction with gas spaces therebetween.

6. The rotor for a rotary electric machine according to claim 3, wherein, at the jumper portion, the plurality of conductors overlap with each other in the axial direction with gas spaces therebetween.

7. The rotor for a rotary electric machine according to claim 2, the rotor further comprising:
a first gas passage which is provided on an outer side in the radial direction of each rotor baffle and through which gas in the second space is discharged to outside; and
a second gas passage extending in the axial direction and provided on an inner side in the radial direction of each of the conductors forming the coils inserted in the slots.

8. The rotor for a rotary electric machine according to claim 7, wherein, at the jumper portion, the plurality of conductors overlap with each other in the axial direction with gas spaces therebetween.

9. The rotor for a rotary electric machine according to claim 2, wherein, at the jumper portion, the plurality of conductors overlap with each other in the axial direction with gas spaces therebetween.

10. The rotor for a rotary electric machine according to claim 2, wherein a cross-sectional shape, of each rotor baffle, that is perpendicular to the axial direction is any one of:
a shape having linear portions extending toward an outer side in the radial direction from both ends in the circumferential direction of a circular arc portion concentric with a cross section perpendicular to the axial direction of an outer circumferential surface of the rotor core;
a linear shape;
a circular arc shape projecting to an inner side in the radial direction;
a mountain-like shape projecting to the inner side in the radial direction;
a trapezoidal shape projecting to the inner side in the radial direction;
a wing shape projecting to the inner side in the radial direction and protruding further to the inner side in the radial direction on a downstream side in rotation direction than on a upstream side in rotation direction, in a rotation direction of the rotor.

11. The rotor for a rotary electric machine according to claim 1, wherein each rotor baffle includes a second tapered shape part tilted from an end on the center side in the axial direction of the first tapered shape part so as to be closer to an outer circumferential surface side of the rotor core toward the center side in the axial direction of the rotor.

12. The rotor for a rotary electric machine according to claim 11, the rotor further comprising:
a first gas passage which is provided on an outer side in the radial direction of each rotor baffle and through which gas in the second space is discharged to outside; and
a second gas passage extending in the axial direction and provided on an inner side in the radial direction of each of the conductors forming the coils inserted in the slots.

13. The rotor for a rotary electric machine according to claim 12, wherein, at the jumper portion, the plurality of conductors overlap with each other in the axial direction with gas spaces therebetween.

14. The rotor for a rotary electric machine according to claim 11, wherein, at the jumper portion, the plurality of conductors overlap with each other in the axial direction with gas spaces therebetween.

15. The rotor for a rotary electric machine according to claim 1, the rotor further comprising:
a first gas passage which is provided on an outer side in the radial direction of each rotor baffle and through which gas in the second space is discharged to outside; and
a second gas passage extending in the axial direction and provided on an inner side in the radial direction of each of the conductors forming the coils inserted in the slots.

16. The rotor for a rotary electric machine according to claim 15, wherein, at the jumper portion, the plurality of conductors overlap with each other in the axial direction with gas spaces therebetween.

17. The rotor for a rotary electric machine according to claim 1, wherein, at the jumper portion, the plurality of conductors overlap with each other in the axial direction with gas spaces therebetween.

18. The rotor for a rotary electric machine according to claim 1, wherein a cross-sectional shape, of each rotor baffle, that is perpendicular to the axial direction is any one of:
a shape having linear portions extending toward an outer side in the radial direction from both ends in the circumferential direction of a circular arc portion concentric with a cross section perpendicular to the axial direction of an outer circumferential surface of the rotor core;
a linear shape;

a circular arc shape projecting to an inner side in the radial direction;

a mountain-like shape projecting to the inner side in the radial direction;

a trapezoidal shape projecting to the inner side in the radial direction;

a wing shape projecting to the inner side in the radial direction and protruding further to the inner side in the radial direction on a downstream side in rotation direction than on a upstream side in rotation direction, in a rotation direction of the rotor.

19. The rotor for a rotary electric machine according to claim 1, wherein each rotor baffle is disposed so as to be shifted to a downstream side in rotation direction in a rotation direction of the rotor with respect to the corresponding coil end portion.

20. The rotor for a rotary electric machine according to claim 1, wherein a plurality of the rotor baffles are provided on an inner side in the radial direction of one of the jumper portions.

\* \* \* \* \*